Dec. 23, 1952     S. LUCAS ET AL     2,622,828
AIRCRAFT DEICING MEANS
Filed March 20, 1950

Inventors
S. Lucas
J. A. Baines

UNITED STATES PATENT OFFICE 2,622,828

AIRCRAFT DEICING MEANS

Sydney Lucas, Harrow, and John Archibald Baines, Acton, London, England, assignors to Rotax Limited, London, England Application March 20, 1950, Serial No. 150,614
In Great Britain April 11, 1949

2 Claims. (Cl. 244—134)

This invention has for its object to provide improved electrical means for de-icing the wing and other skin surfaces of aircraft.

The invention comprises the combination with the rear side of a metal skin, of bus bars connected to the skin at a plurality of adjacent points, so that an electric current can be caused to flow through the skin between the said points.

Figure 1:
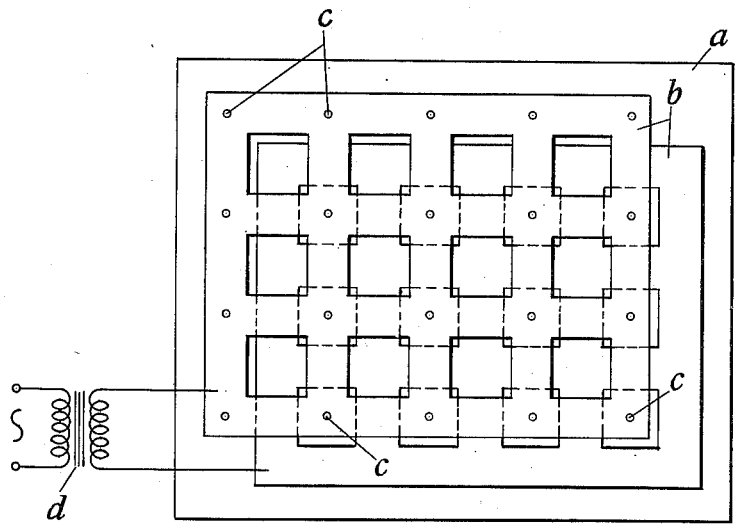
Figure 2:
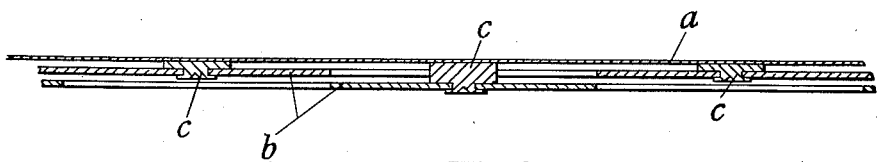

In the accompanying drawings:

Figure 1 is a plan illustrating diagrammatically one embodiment of the invention applicable to an aircraft wing, and Figure 2 is a longitudinal section drawn to a larger scale than Figure 1.

Referring to the drawings, the skin $a$ of the wing is made from thin metal sheet of high electrical resistance. For example it may be made from nickel-chrome steel. At the rear side of the skin are placed a pair of bus bars $b$, or a system of such bars. Each bar in one convenient form is made from a rectangular sheet of aluminium or other high-conductivity metal. The sheet is perforated with rectangular or other holes to form a grid. One such sheet is placed behind (but separate from) and parallel with the other, and at a plurality of points each is connected to the rear side of the skin by metal studs $c$ which are welded to the skin and welded or riveted to the bus bars. The studs of each bar are connected at intervals along the edges of the bar and at the intersections of the parts between the perforations as indicated in Figure 1. Also the bars are arranged in staggered relation, so that the studs of the innermost bar pass through the perforations of the bar lying between it and the skin. The arrangement is such that the studs are electrically interconnected by the skin, and current supplied through the bars flows through the skin along paths determined by the positions of the studs. The current may be conveniently supplied from an A. C. source through a transformer $d$.

Whilst the invention is especially intended for de-icing the wing surfaces of an aircraft, it may be applied in essentially the same manner to other parts. Also whilst it is convenient and advantageous to make the bus bars as above described, the invention is not restricted thereto, as any other convenient arrangement may be used. Thus the bars may consist of two sets of strips, the strips in each set being arranged parallel with each other.

By this invention electrical heating of the skin can be effected in a very simple and satisfactory manner, and without affecting the smooth configuration of the external surface of the skin.

Having thus described our invention what we claim as new and desire to secure by Letters Patent is:

1. Means for de-icing the metal skin of aircraft, comprising the combination with the skin which is made of thin sheet metal having high electrical resistance, of bus bars arranged adjacent to each other and to the rear side of the skin in planes parallel with and spaced from the skin, and a multiplicity of metal studs securing and electrically connecting each of the bus bars to the skin at a plurality of spaced positions so that electric current supplied through the bus bars can flow through the skin between the studs.

2. Means for de-icing the metal skin of aircraft, comprising the combination with the skin which is made of thin sheet metal having high electrical resistance, of at least one pair of parallel and perforated current-conducting plates arranged in staggered and spaced relationship adjacent to and parallel with each other and the rear side of the skin, and a multiplicity of metal studs securing and electrically connecting the plates to the skin at a plurality of spaced positions along the edge portions of, and between the perforations in, the plates.

SYDNEY LUCAS.
JOHN ARCHIBALD BAINES.

REFERENCES CITED

The following references are of record in the file of this patent:

UNITED STATES PATENTS

| Number | Name | Date |
|---|---|---|
| 2,142,785 | Hanson | Jan. 3, 1939 |
| 2,205,543 | Rideau et al. | June 25, 1940 |
| 2,391,994 | McCollum | Jan. 1, 1946 |